April 22, 1969  W. E. RUSHTON  3,440,010
METHOD AND APPARATUS FOR MAKING SUPERPHOSPHORIC ACID
Filed Dec. 23, 1965

INVENTOR
WILLIAM E. RUSHTON
BY Greist, Lockwood,
Greenawalt & Dewey
ATTORNEYS

United States Patent Office 3,440,010
Patented Apr. 22, 1969

3,440,010
METHOD AND APPARATUS FOR MAKING SUPERPHOSPHORIC ACID
William E. Rushton, South Holland, Ill., assignor to Whiting Corporation, a corporation of Illinois
Filed Dec. 23, 1965, Ser. No. 515,846
Int. Cl. C01b 25/18
U.S. Cl. 23—165                      6 Claims

ABSTRACT OF THE DISCLOSURE

Process and apparatus for concentrating a feed containing orthophosphoric acid to produce a superphosphoric acid product wherein film-like formations which build up on the inner surfaces of heat exchanger tubes during normal operation are removed by periodically circulating through the heat exchanger tubes a film-removing liquid having a phosphoric acid content wherein substantially all of the phosphoric acid is present in the form of orthophosphoric acid.

---

Figure 1:
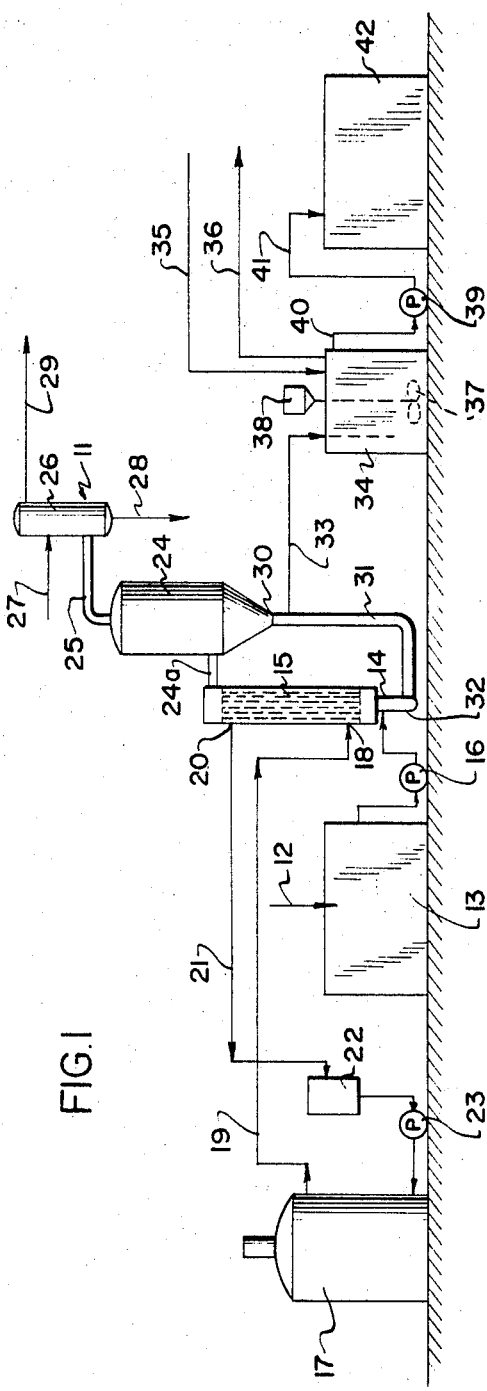

The present invention relates to improvements and innovations in method and apparatus for making superphosphoric acid. More particularly, this invention is concerned with an improved method and apparatus for increasing the heat transfer efficiency of heat exchanger tubes in forced circulation evaporator systems which are used for producing superphosphoric acid. In this regard, an important aspect of the present invention involves the elimination of the need for using "boilout" solutions to remove deposits which build up on the heat exchanger tube surfaces during normal operation when superphosphoric acid is being produced.

As used in the specification and claims the term "superphosphoric acid" is intended to cover high concentration phosphoric acid (viz having a $P_2O_5$ concentration of approximately 68% or more) wherein at least a portion of the orthophosphoric acid has been converted to pyrophosphoric acid and higher polyphosphoric acids such as, tripolyphosphoric acid. In this application all reference to phosphoric acid strength will be made by indicating the equivalent $P_2O_5$ concentration since this is the accepted standard acid strength identifying designation for the wet process phosphoric acid industry. It will, of course, be apparent to those skilled in this art that $P_2O_5$, as such, does not exist in wet process phosphoric acid.

One of the most commercially important methods of producing phosphoric acid (called the "wet process" method) involves reacting phosphate rock with sulphuric acid. This reaction produces an acid having a $P_2O_5$ content of around 30%. Conventionally, it has been common to concentrate the products of this reaction to produce a phosphoric acid having a $P_2O_5$ content of around 54%.

Recently there has been increased interest in the production of more highly concentrated phosphoric acid. One of the important factors which has prompted this increased interest is the ability of superphosphoric acid to sequester solids. This property enables wet process superphosphoric acid to be used in liquid fertilizer applications. Until this time, it has been necessary to use more expensive furnace grade phosphoric acid for this service. Other important advantages of superphosphoric acid include such things as low fluorine content and shipping savings.

As background, it should be noted that there are a number of known techniques for concentrating a wet process phosphoric acid to produce a superphosphric acid product having a $P_2O_5$ concentration of 68%, by weight, or more. One of these techniques involves the use of a submerged combustion or hot gas evaporator.

This equipment is generally less satisfactory for high volume production since it necessitates the use of expensive gas scrubbing equipment and poses serious size limitation problems. For example, it has been found that single installations cannot generally exceed a capacity of from 30 to 50 tons of $P_2O_5$ per day. Accordingly, where large production is desired, multiple units must be installed. Also, the higher temperatures which exist in these units tend to cause the precipitation of iron and aluminum tripolyphosphate. In order to prevent this from happening, this type of evaporator must be designed for very short acid retention times.

Natural circulation, long tube vertical (LTV) and falling film evaporators have also been used for the production of superphosphoric acid. It has been found that with both these type evaporators scale forms in the tubes which seriously reduces the heat transfer efficiency thereof. Also, since vapors are formed in the tubes of both of these types of evaporators and since the vapors are more corrosive than the acid itself, tube life therein is adversely effected. In this regard, it should be noted that due to heat exchanger requirements, the heat exchanger tubes generally represent the thinnest material in the evaporator and at the same time, are exposed to the highest temperatures.

As noted above, in both the falling film and LTV evaporators, scale formations build up in the heat exchanger tubes. This scale, an insoluble metal salt precipitate, is formed by the reaction of acid with iron and aluminum. In order to remove this precipitate, it is necessary to shut down these units every three to four days and clean the tubes with a boilout solution. Each of these shutdowns or tube cleaning operations takes about 24 hours. Accordingly, at maximum output, each of these types of evaporators is not producing superphosphoric acid for about 20% to 25% of the time.

Forced circulation evaporators have also been employed for the production of superphosphoric acid. While the present invention is particularly concerned with forced circulation evaporator apparatus, the principles thereof can also be applied to other types of evaporators wherein the process side of the heat exchanger is submerged in liquid, such as, for example, calandria and horizontal-tube evaporators. In accordance with this invention, it has been discovered that when the heat transfer efficiency in these evaporators is reduced, efficient heat transfer can be restored by recycling a phosphoric acid liquid in which the phosphoric acid content is composed of essentially 100% orthophosphoric acid through the process side of the heat exchanger (i.e. by recycling orthophosphoric acid through the heat exchanger tubes in a forced circulation evaporator). In this regard, it is important to not that the use of a boilout solution in these evaporators, which was previously thought to be essential, has been completely eliminated.

An important aspect of the present invention involves the discovery that in the production of superphosphoric acid, a film-like formation composed essentially of pyrophosphoric acid and tripolyphosphoric acid builds up on the inner surfaces of the heat exchanger tubes during normal operation when the evaporator is being used to produce superphosphoric acid. While this film-like formation will act to prevent the build up of scale on the heat exchanger tubes, it interferes with heat transfer and as such, must be removed. Accordingly, as noted above, the present invention is concerned with a novel, inexpensive and highly advantageous technique for removal of this film-like formation.

The novel film removal technique of the present invention takes only about five or six hours and need only be done about once every five to ten days. Accordingly, it will be readily apparent that forced circulation evaporators equipped and operated in accordance with the present invention are able to produce superphosphoric acid for a substantially greater proportion of the time than can the LTV and falling film evaporators referred to above. In this regard, it should be noted that in a preferred embodiment of the present invention the full evaporation (lbs. of $H_2O$ per hour) can be maintained during the cleaning or film removal operation.

It is, therefore, an important object of the present invention to provide an improved method and apparatus for producing superphosphoric acid in forced circulation evaporators.

Another object of the present invention is to provide an improved method and apparatus for restoring efficient heat transfer in an evaporator used for producing superphosphoric acid wherein the evaporator includes a heat exchanger having a process side which is submerged in liquid during operation when superphosphoric acid is being produced.

Another object of the present invention is to provide an improved method and apparatus for the production of superphosphoric acid, which method and apparatus substantially increase the output of superphosphoric acid in a forced circulation evaporator by reason of a substantial decrease in the time required for "boilouts" or tube cleaning operations.

Another object of the present invention is to provide an improved method and apparatus for maintaining efficient heat transfer in forced circulation evaporators, which method and apparatus involve novel techniques for the removal of pyrophosphoric and tripolyphosphoric acid coatings which build up on the inner surfaces of the heat exchanger tubes when the evaporator is producing superphosphoric acid.

Another object of the present invention is to provide an improved method and apparatus for maintaining efficient heat transfer in forced circulation evaporators, which method and apparatus eliminate the need for the use of boilout solutions as heat exchanger tube cleaning agents.

Another object of the present invention is to provide an improved method and apparatus for maintaining efficient heat transfer in an evaporator of the type wherein the process side of the exchanger is submerged in liquid superphosphoric acid which improved method and apparatus enable scale or film removal from the process side of the heat exchanger while still maintaining full evaporation (lbs. of water per hour) during the cleaning operation.

Figure 2:
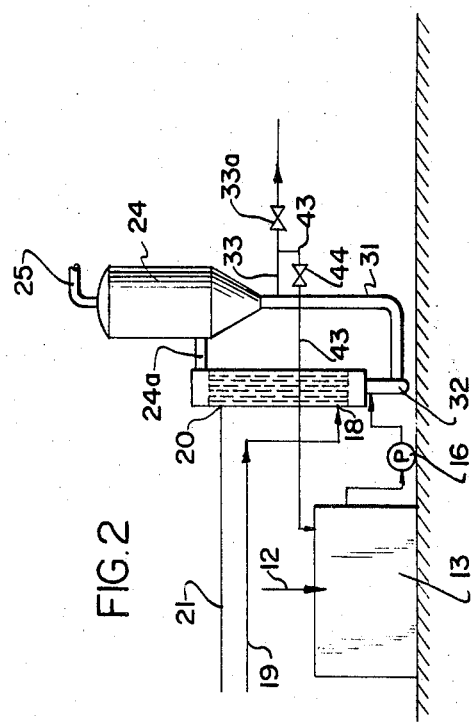

Other and further objects of the present invention will be apparent from the following detailed description of the accompanying drawings wherein:

FIGURE 1 is a flow diagram illustrating a forced circulation evaporator system equipped for the production of superphosphoric acid in accordance with one embodiment of the present invention; and FIGURE 2 is a fragmentary flow diagram in a forced circulation evaporator system, identical to that shown in FIGURE 1, illustrating a modified embodiment thereof.

Referring to the drawings, and with particular reference to FIGURE 1, the reference numeral 11 generally designates a forced circulation evaporator system adapted for concentrating a phosphoric acid feed to produce a superphosphoric acid product in accordance with the principles of the present invention.

In the embodiment illustrated in FIGURE 1, phosphoric acid feed having a phosphoric acid feed content composed of essentially 100% orthophosphoric acid, schematically designated by the numeral 12, is introduced into a clarifier 13. Clarifier 13 is sized in accordance with the requirements of the available acid feed and generally has a total volumetric capacity of about eight to ten times the hourly feed rate. While the $P_2O_5$ concentration of the acid feed will vary in accordance with the characteristics of the acid feel available, experimental systems have been produced wherein a feed containing 54% $P_2O_5$, by weight, has been used. Clarifier 13 while not essential to the operation of the entire system, is advantageously used to control the nature and composition of the acid which is concentrated. After the acid feed has been clarified, it is pumped into the tube inlet side 14 of a heat exchanger 15 by means of a centrifugal pump 16.

In the heat exchanger 15, the acid feed is heated to around 400° F. The heating medium can vary in accordance with the requirements of the particular system. For example, in producing superphosphoric acid having a $P_2O_5$ content of from around 68% to 72%, steam can be used as the heating medium. As is shown, a heater 17 is connected to the shell inlet 18 through a piping arrangement diagrammatically designated by the numeral 19. The heating medium is returned to heater 17 from shell outlet 20 through return piping 21 which includes an expansion tank 22 and pump 23. In systems where higher temperatures are required, the use of high temperature heat transfer liquids as the heating medium is preferred. Heater 17 can be fueled by any available heat supply, such as, for example, gas or oil.

As is shown in FIGURE 1, the phosphoric acid feed passes through heat exchanger 15 in concurrent flow with the heating medium. Evaporator inlet 24a communicates the heat exchanger tube outlet directly with the interior of evaporator chamber 24. Since the static head of the heated phosphoric acid contained in the upper portion of heat exchanger 15 prevents boiling of the heated acid in the heat exchanger tubes, this acid will immediately flash upon being discharged into the interior of evaporator chamber 24 which is preferably operated under vacuum conditions.

In evaporator chamber 24, the water and the lower boiling constituents of the feed are vaporized and passed through overhead outlet 25 into a condenser 26 which is fed with water or other coolant as shown by numeral 27. The condensed materials exit from condenser 26 through an outlet 28 to a hotwell (not illustrated). Vapor outlet 29 communicates with an air ejector to remove non-condensable gases.

The unvaporized contents of evaporator chamber 24 exit through outlet 30 located in the frusto-conical bottom thereof and communicate with tube inlet 14 of heat exchanger 15 through conduit 31. A pump 32 provides forced circulation for the recycling liquid. A portion of the recycling liquid in conduit 31 is drawn off at 33, as the superphosphoric acid product.

The superphosphoric acid product which is removed through conduit 3 is preferably reduced in temperature prior to being transferred to storage. One means for accomplishing this is schematically shown in FIGURE 1 and consists of a cooling tank 34 supplied with cooling water at 35, which is circulated through a coil (not illustrated) in the cooling tank 34, exiting therefrom through a return conduit 36. Cooling tank 34 is equipped with a fan type agitator 37 driven by a motor 38 for improving temperature uniformity in the tank. Cooled superphosphoric acid product is removed from cooling tank 37 by pump 39 which is connected to cooling tank 34 on its suction side by a conduit 40. Pump 39 discharges into conduit 41 which deposits the superphosphoric acid in a suitable storage means schematically designated by reference numeral 42.

In order to more fully understand the present invention, it is necessary that some of the chemistry involved in the conversion of superphosphoric acid be presented. In this regard, however, it should be noted that while the present explanation of the chemistry involved is believed to be true, applicant does not intend to be bound by any particular theory or explanation of the present invention. As noted above, superphosphoric acid is generally described as a phosphoric acid wherein some of the orthophosphoric acid has been converted to a non-orthophosphoric acid. Lower concentration phosphoric acid (where the $P_2O_5$ concentration is 65% or below) consists of essentially all orthophosphoric acid. During the concentration of this material, free water is driven off with the orthophosphoric acid molecules going through a dehydration process wherein two molecules of orthophosphoric acid combine to form one molecule of pyrophosphoric acid plus one molecule of water. This reaction can generally be described as follows:

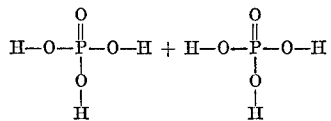

Orthophosphoric acid

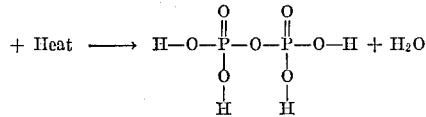

Pyrophosphoric acid

Some of the pyrophosphoric acid formed will further react with another molecule of orthophosphoric acid to form tripolyphosphoric acid. This reaction may be shown as follows:

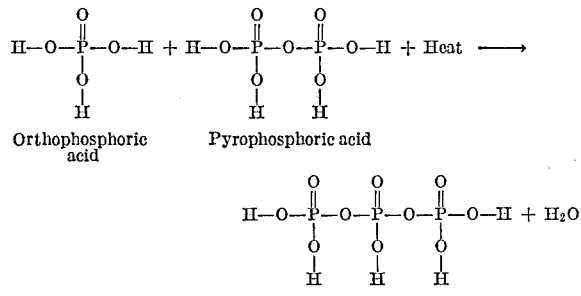

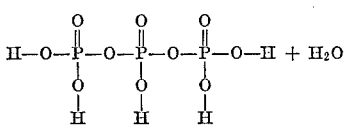

Tripolyphosphoric acid

In accordance with an important aspect of this invention, it has been discovered that in phosphoric acid concentrating equipment of the forced circulation type a film-like formation will build up on the tube walls which is essentially composed of the pyrophosphoric acid and tripolyphosphoric acid. This film-like formation prevents the deposition of metal salts on the tube walls, however, it has the disadvantage of reducing heat transfer thus adversely effecting the efficiency of the over-all operation.

In this regard, and in connection with a very important aspect of the present invention, it was discovered that this film-like formation composed of the non-orthophosphoric acid can be removed from the tube walls by recycling or passing orthophosphoric acid through the tubes. Thus, it was discovered that the heat exchanger tube walls in a forced circulation evaporator system, used for producing superphosphoric acid, can be cleaned without the use of boilout solutions.

The significance of this discovery becomes apparent when it is noted that, by the practice of this invention, the heat exchanger tubes of a forced circulation evaporator used for producing superphosphoric acid can be cleaned without having to replace the acid contained therein with a boilout solution and then, after the tube cleaning operation, replace the solution with acid feed.

One method for accomplishing this novel film removal involves shutting off the heat to the heat exchanger. This results in a reduction of the $P_2O_5$ level in the acid contained in the evaporator system with a conversion of all non-orthophosphoric acid back to orthophosphoric acid when the $P_2O_5$ concentration in the acid drops to about 65%, by weight. In effect, this method can be simply characterized as a pumping of the orthophosphoric acid feed through the evaporator system.

Another variation in the method of the present invention for effecting this heat exchanger film removal involves increasing the amount of phosphoric acid feed to the system so that the $P_2O_5$ concentration of the phosphoric acid in the system drops to 65% or below wherein the phosphoric acid content thereof is essentially all in the form of orthophosphoric acid. In effecting this film removal technique, the acid product drawn off at product line 33 can be recycled back to clarifier 13 or to a separate storage area until completion of the tube cleaning operation at which time it is returned to the system as acid feed. The important advantage of this technique is that a loss in evaporation capacity is not encountered in that the amount of water evaporated from the system is maintained at a constant level.

Thus, the basic concept involved in the present invention can be defined as the recycling of phosphoric acid liquid having a phosphoric acid content composed of essentially 100% orthophosphoric acid through a forced circulation evaporator system used for the production of superphosphoric acid to remove non-orthophosphoric acid films which have built up on the tube walls and other portions of the system.

Another important advantage of the present invention is that the so-called "shutdown time" is substantially reduced. In conventional equipment, such as, for example, LTV or falling film type evaporators, it is generally necessary to remove the scale developed on the heat exchanger tubes and other components about every three or four days. Each of these shutdowns takes about twenty-four hours. Accordingly, at maximum output, these systems are not producing superphosphoric acid around 20% to 25% of the time.

In forced circulation evaporators which are equipped and operated in accordance with the present invention, however, it has been found that the recycling of an essentially 100% orthophosphoric acid through the system removes substantially all pyrophosphoric and tripolyphosphoric acid films from the tube walls in about five or six hours. In this regard, it should also be noted that it is generally only necessary to recycle the orthophosphoric acid through the system about once every five to ten days. Thus, superphosphoric acid concentrating systems operated in accordance with the present invention are able to produce a product around 95% to 98% of the time as opposed to around 75% to 80% of the time with conventional equipment.

FIGURE 2 is a fragmentary flow diagram illustrating a modification of the forced circulation evaporator system shown in FIGURE 1. As modified, the evaporator system shown in FIGURE 2 is particularly adapted for employment of the above-mentioned film removal technique wherein the acid feed rate is increased and the evaporation rate (measured in pounds of water per hour) is kept constant.

As is shown in FIGURE 2, a return pipe 43 connecting product line 33 with clarifier 13 enables the mixing of product exiting from line 33 with the incoming acid feed. If desired, return pipe 43 can be arranged to discharge into a separate storage area wherein it can be maintained until the tube cleaning operation is completed, at which time it is then returned to the evaporator system as phosphoric acid feed.

As is apparent from FIGURE 2, during normal operation when superphosphoric acid is being produced, valve 44 is closed and valve 33a opened to the extent that it permits removal of superphosphoric acid at the desired rate. During heat exchanger tube cleaning, valve 33a is closed and valve 44 opened, thereby communicating product line 33 with clarifier 13. In this manner the more highly concentrated product is diluted with the acid feed.

In the foregoing specification a detailed description of certain embodiments of the present invention has been set forth for purposes of explanation. It will, however, be apparent that modification and variations therefrom may be made by those skilled in the art without departing from the spirit and scope of this invention.

I claim:
1. The improved method of producing superphosphoric acid in an evaporator having an evaporating chamber, a heat exchanger and recycle process piping which communicates the evaporating chamber with the process side of said heat exchanger, said method comprising: forming a film-like formation of non-ortho forms of phosphoric acid on the process side of said heat exchanger by maintaining a liquid head of recycling phosphoric acid on said heat exchanger process side during normal operation of said evaporator; and, periodically circulating a film-removing liquid through said heat exchanger process side, said film removing liquid consisting essentially of orthophosphoric acid.

2. The method of claim 4 wherein said film removing liquid which is circulated through said heat exchanger has an equivalent $P_2O_5$ concentration of approximately 65%, by weight, or less.

3. The method of claim 4 wherein said film-like formations of non-ortho forms of phosphoric acid include pyrophosphoric and tripolyphosphoric acids.

4. The method of producing superphosphoric acid in a forced circulation evaporator from an orthophosphoric acid feed, said forced circulation evaporator having a heat exchanger equipped with heat exchanger tubes through which recycling phosphoric acid passes prior to being returned to an evaporating chamber, said method comprising the steps of: forming a film-like formation of non-ortho forms of phosphoric acid on said heat exchanger tubes by maintaining a liquid head of recycling phosphoric acid on said heat exchanger tubes during normal operation of said forced circulation evaporator, thereby preventing the formation of a crust-like scale on the process side of said heat exchanger tubes; and, periodically circulating a film-removing liquid through said heat exchanger tubes, said film-removing liquid consisting essentially of orthophosphoric acid.

5. The method of claim 4 wherein the film-removing liquid is produced by increasing the feed rate of orthophosphoric acid to said forced circulation evaporator to an extent necessary to convert essentially all of the non-orthophosphoric acid in said evaporator to orthophosphoric acid.

6. The method of claim 4 wherein said film-like formations or non-ortho forms of phosphoric acid include pyrophosphoric and tripolyphosphoric acids.

References Cited

UNITED STATES PATENTS 3,338,745   8/1967   Thorn et al.   23—165 X
3,192,013   6/1965   Young   23—165

FOREIGN PATENTS 540,854   11/1941   Great Britain.

OSCAR R. VERTIZ, *Primary Examiner.*

ARTHUR GREIF, *Assistant Examiner.*

U.S. Cl. X.R.

159—26, 47

PO-1050
(5/69)

UNITED STATES PATENT OFFICE
CERTIFICATE OF CORRECTION

Patent No. 3,440,010      Dated April 22, 1969

Inventor(s) William E. Rushton

It is certified that error appears in the above-identified patent and that said Letters Patent are hereby corrected as shown below:

Column 1, line 68, "superphosphric" should read --superphosphoric--

Column 2, line 51, "not" should read --note--

Column 2, line 58, after "tripolyphosphoric acid" insert -- (metaphosphoric acid)--

Column 4, line 49, the number "3" should read --33--

Column 8, line 12, "or" should read --of--

SIGNED AND
SEALED
MAR 17 1970

(SEAL)
Attest:

Edward M. Fletcher, Jr.
Attesting Officer

WILLIAM E. SCHUYLER, JR.
Commissioner of Patents